United States Patent

[11] 3,588,120

[72] Inventor  Jack E. Bayha
              11753 Sperry Road, Chesterland, Ohio 44026
[21] Appl. No. 818,017
[22] Filed     Apr. 21, 1969
[45] Patented  June 28, 1971

[54] PLASTIC RECORD TURNTABLE SPINDLE
     6 Claims, 5 Drawing Figs.
[52] U.S. Cl. ................................................ 274/10
[51] Int. Cl. .......................................... G11b 17/04
[50] Field of Search ............................. 274/10 (S), 10

[56]           References Cited
            UNITED STATES PATENTS
3,046,021  7/1962  Perge ........................ 274/10
3,273,895  9/1966  Simpson .................... 274/10

Primary Examiner—Leonard Forman
Assistant Examiner—Steven L. Stephan
Attorney—Oldham and Oldham ABSTRACT: The invention relates to a plastic spindle for a record turntable. Specifically, the invention relates to a spindle formed either by injection molding or otherwise molding to spindle shape of high-strength plastic while still allowing the spindle to function in exactly the same manner it has heretofore. The round portion of the interior is tapered, and a ring of the same material as the interior, preferably molded in the same die, is pushed into the open end to handle the necessary tapered hole, yet assures full support. The blades of the spindle are to be left as stampings, since the weight is advantageous in the operation of the spindle. A Teflon tube heat shrunk over molded rings forms the base spindle bearing. The plastic value in filtration of noise is well known.

PATENTED JUN28 1971

3,588,120

INVENTOR.
JACK E. BAYHA
BY
Oldham & Oldham
ATTORNEYS.

PLASTIC RECORD TURNTABLE SPINDLE

Heretofore the type of metal spindle for record turntables has been well known. Particularly, the spindle utilized by the V-M Corporation is well recognized in the art as the most practical and operationally efficient turntable spindle known by the art. However, because the V-M spindle must necessarily be made of metal, the noise filtration is decreased, together with necessary machining to achieve the proper design. Hence, costs are increased also.

The general object of the invention is to provide a plastic spindle for a record turntable, which is particularly designed to function with V-M Corporation turntables, and operate with the existing V-M equipment. However, the cost of production would be greatly decreased, while operational capabilities would be enhanced.

A further object of the invention is to provide a plastic record spindle which has the bottom portion thereof molded in such a shape as to be retained by means of either Waldes ring or a Tinnerman fastener. A turntable bearing might be molded integrally with the spindle to work against a reamed hole in the turntable thus eliminating the need for turntable bearings. A Teflon tube heat shrunk over the molded rings forms an ideal bearing surface.

For a better understanding of the invention, reference should be had to the accompanying drawings wherein.

Figure 1:
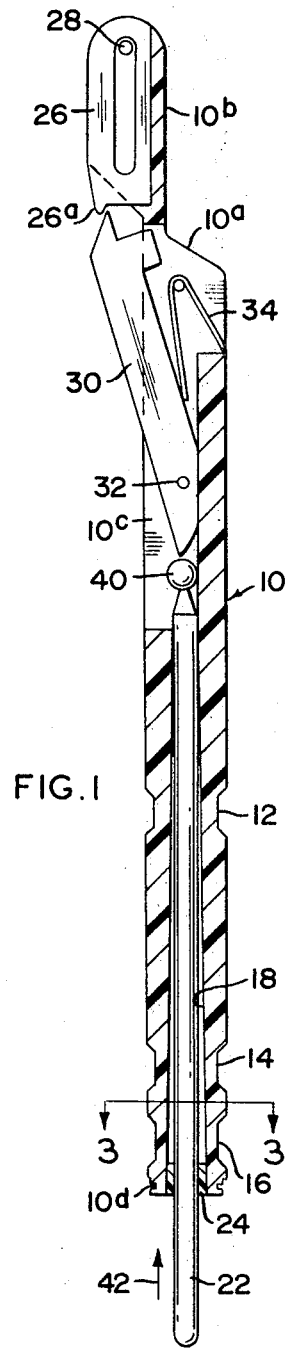
FIG. 1 is a cross-sectional view of a plastic spindle formed to the preferred embodiment of the invention.

With reference to the form of the invention illustrated in FIG. 1 of the drawings, the numeral 10 illustrates a plastic body which is molded of GE Lexan or other polycarbonate material, or even some of the higher TS Delrins, or some of the high-strength plastic materials presently available in Japan. The body 10 is a one-piece molded construction which incorporates recesses 12, 14 and 16, as illustrated which are annular rings around the body portion of the spindle adapted to cooperate with bearings associated with the turntable, and with the drive mechanism, as will be more fully explained hereinafter.

Figure 5:
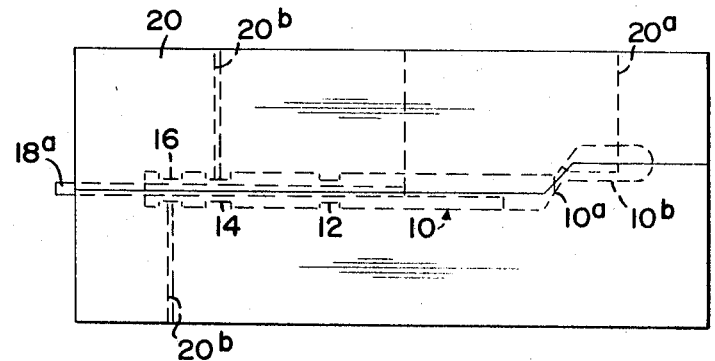
FIG. 5 is a side elevational view of the mold utilized to form the plastic spindle of FIG. 1, showing the molding technique therefor.

An elongated tapered hole 18 is provided down the interior of the body 10, substantially on the axis thereof, with the taper being of an appropriate angle so that it can be formed in the mold 20 with the pin 18a, as seen in FIG. 5 of the drawings. The tapering of pin 18a allows its removal from the molded body. Preferably, the pin 18a will be of such diameter at its inner end so as to allow a close fitting sliding tolerance of the end of a uniform diameter rod 22 slidably received into the hole 18. The outer end of rod 22 is slidably received into a ring of the same material as the body 12, which preferably is molded in the same die 20, (although this is not illustrated, it is well within the skill of one in the mold art) and is pressed or wedged into the open end of hole 18 to handle the enlarged end of tapered hole 18, but provide close fitting, sliding support to rod 22, as is illustrated in FIG. 1.

The upper end of the body 10 comprises an offset neck portion 10a, and a record-carrying head 10b, all which is substantially the same as the conventional V-M spindle design. A stamped sliding metal guide 26 is held in sliding relation by a small metal pin 28. A stamped metal trigger 30 is pivotally mounted by pin 32 to the body 10, and cooperates with lip 26a of slide key 26, all as is well understood by those skilled in the art. An appropriate spring 34 cooperates with the actuating level 30 to bias it outwardly to the position shown in the drawings. A slot 10c is formed in the body by an appropriate blade 20a formed to the desired shape and cooperating with the mold 20, as is quite clearly illustrated in FIG. 5. The slot 10c slidably receives the key 26 and the actuating trigger 30.

The rod 22 cooperates with a small ball 40 which in turn causes proper actuation of trigger 30, again in a manner well understood by those skilled in the art. In other words, an upward movement of rod 22 in the direction of arrow 42 causes the trigger 30 to be depressed and one record to be dropped from the carrying head 10b on down the remaining body portion 10 to the turntable associated therewith. The actuation of rod 22 is contemplated to be in the conventional manner.

As one other feature of the invention, a recessed groove 10d is provided around the base of the body 10, as illustrated in FIG. 1 to receive a Waldes ring or a Tinnerman fastener to position the body into a changer mechanism. This mechanism is illustrated by numeral 50 in FIG. 4, and the Waldes ring is indicated by numeral 52. The recesses 14 and 16 cooperate with the mechanism 50, as has been the past practice in the V-M changer.

Figure 2:
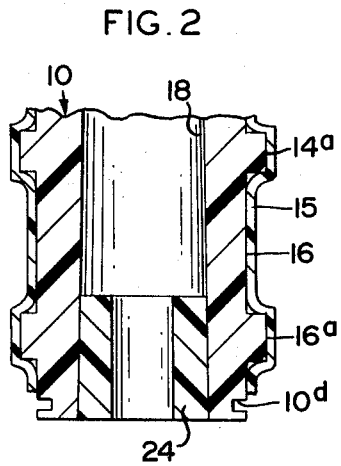
FIG. 2 is an enlarged vertical cross-sectional view of only the lower end of the spindle of FIG. 1.

FIG. 2 more accurately depicts the recess 10d with relation to the bottom end of the body 10, and quite clearly illustrates the tapered relationship of insert 24 to cooperate with the tapered hole 18, and allow close sliding fit of rod 22 through the cylindrical center hole therethrough.

FIG. 2 also illustrates a preferred adaptation in the use of the recessed grooves 14 and 16, which form raised rings 14a and 16a. This comprises the slidable positioning of a Teflon (polytetrofluorboroethylene) tube 15 over the end of the spindle body 10 which is then heat shrunk into the position illustrated, making a nearly perfect bearing. The heat shrinking is well understood by those skilled in the art and gives a snug and essentially integral fit of the tube 15 over the rings 14a and 16a forming the slightly rounded or tapered edges with respect to the rings as illustrated. The positioning of the tube 15 and heat shrinking thereof into firm relation can be quickly and inexpensively accomplished.

Figure 3:
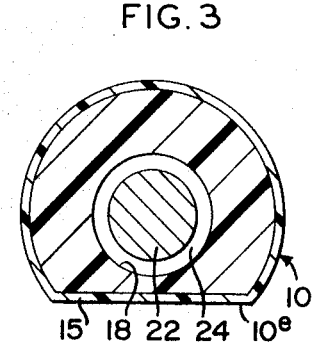
FIG. 3 is an enlarged horizontal cross-sectional view of the bottom portion of the spindle of FIG. 1 taken on line 3–3 thereof.

The bottom portion of body 10 might be molded to a D-shaped configuration, as illustrated in FIG. 3 so as to have a flat side at 10e, which can thereby cooperate with the changer mechanism 50 to effectively stop the body 10 from rotating or turning. The D flat 10e would only extend on that portion of the body 10 which cooperates with the changer mechanism 50. Note the spaced relationship of rod 22 with respect to the hole 18 in FIG. 3 caused by the taper of hole 18.

Figure 4:
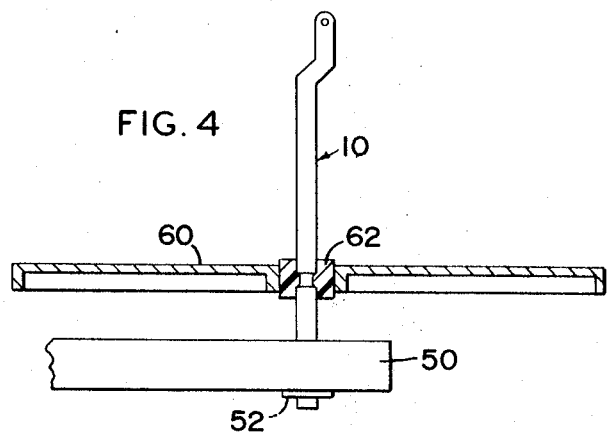
FIG. 4 is a cross-sectional schematic illustration of how the spindle is utilized with the V-M turntable and driving mechanism.

FIG. 4 also illustrates the positioning of a turntable 60 having a reamed central hole therethrough with respect to the spindle body 10. In this instance, a separately formed bearing 62 is snapped into place around recess 12 in the body 10, and forced into snug fitting relationship with the turntable 60 so as to provide an aligned rotatable relationship around the body 10 by the turntable 60. The invention contemplates that the bearing 62 might be a Teflon material or the like, which cooperates with the reamed central hole in the turntable, and effectively eliminates the need for more expensive turntable bearings. Also, of course, the plastic value in filtration of noise is well known.

Hence, it should be understood that the spindle follows closely the well-known V-M spindle design. However, the body is molded of some type of appropriate plastic material. The round hole portion of the interior of the plastic body is tapered, and a ring of the same material, molded preferably in the same die, is pushed into the open end to handle the necessary tapered hole, yet assure full support to the actuating rod 22.

The bottom portion of the spindle body 10, which is used as a retainer for the same, is molded in such a shape as to be snugly engaged by the D-shaped fitting into the changer mechanism 50, and retained by some appropriate removable snap ring means received into groove 10d. The need for nonrotation is not severe. Other type appropriate arrangements in the molded base of the body 10 could be utilized to secure the nonrotational features desired. For example, the base could have a notch, into which a corresponding key could be cast to fit, in the frame assembly.

The blades of the spindle body 10, namely blades 30 and 26, are contemplated to be formed as metal stampings, since the weight is advantageous in the operation of these components.

It is preferably contemplated that injection molding in mold 20 will be utilized with the injection taking place for example through one or more holes or gates 20b appropriately included in the mold 20. Those skilled in the mold art are well aware of the best molding techniques.

While in accordance with the patent statutes only the best known embodiments of the invention have been illustrated and described in detail, it is to be particularly understood that the invention is not limited thereto or thereby, but that the inventive scope is defined in the appended claims.

I claim:

1. A spindle for association with a record changer which spindle comprises a one piece plastic spindle body having an elongated straight portion along most of its length, with an offset neck and head integrally formed therewith at one end of the elongated portion in parallel offset relationship to the elongated portion, a slot in the head, neck and upper end of the elongated portion, a pair of blades mounted in each of the head and the elongated portion, the blade mounted in the elongated portion being pivotally mounted for the purpose of changing records, and spring-biasing means cooperating with the pivoted blade to normally urge it in one direction, a tapered hole through the elongated portion extending from the slot to the other end of the elongated portion, with the narrow end of the tapered hole opening into the slot, a rod slidably received in the hole in snug fitting relationship only with the narrow end, an insert received in the wide end of the hole and slidably receiving the rod in snug fitting relationship, and a ball bearing positioned between said pivoted blade and the inner end of the rod to pivot said pivoted blade against said spring-biasing means and change records upon sliding movement of the rod towards the blade.

2. A spindle according to claim 1 which includes a recessed groove molded into the plastic body along the elongated portion thereof, and a molded plastic bearing snapped into position in such groove.

3. A spindle according to claim 1 where the other end of the elongated portion of the body is formed with a flat side to mate in nonrotatable relationship with a complementary hole in a changer mechanism.

4. A spindle according to claim 1 which includes a recessed angular groove adjacent the end of the elongated portion of the body adapted to receive a removable locking ring snapped in place thereover to retain the spindle body in fixed relation to a changer mechanism.

5. A spindle according to claim 1 where the body is molded from polycarbonate plastic material.

6. A spindle according to claim 1 having at least a pair of rings molded integrally adjacent the other end of the elongated portion, and a low friction tube slidably positioned over the rings and heat shrunk into snug relation therewith to form a bearing surface.